E. W. BEMIS.
WORK HOLDING DEVICE.
APPLICATION FILED AUG. 3, 1916.
1,260,130. Patented Mar. 19, 1918.
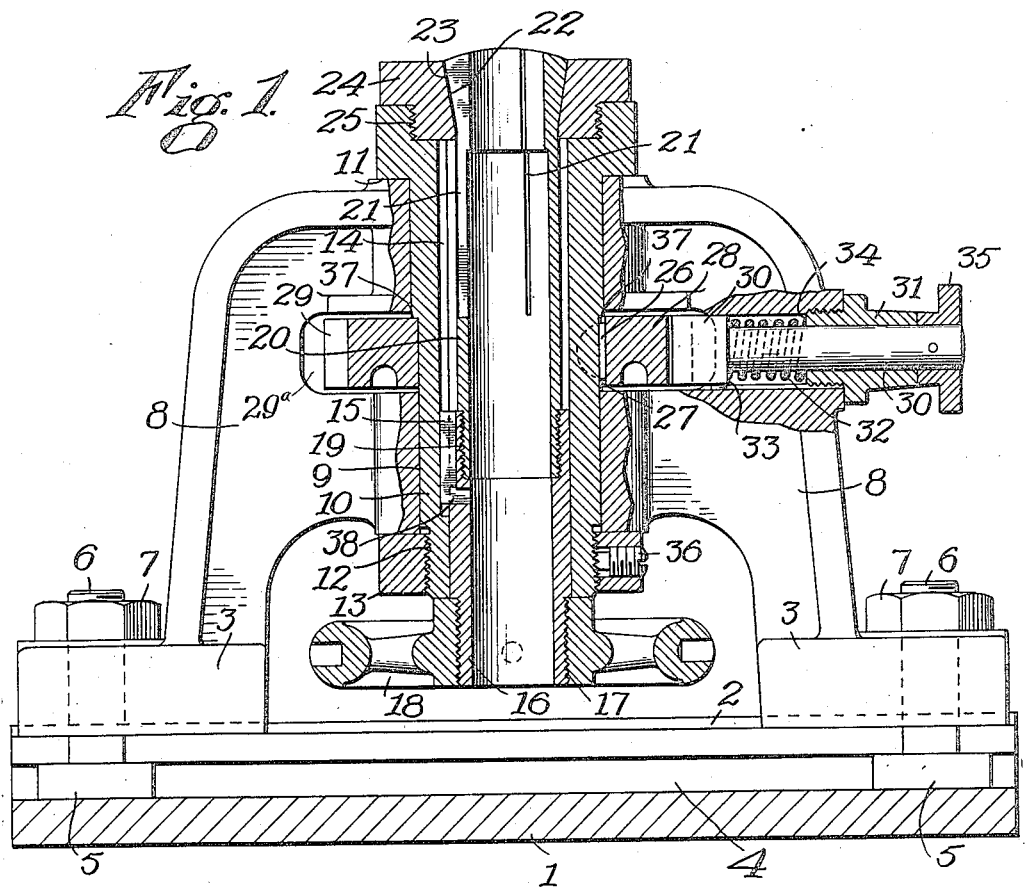
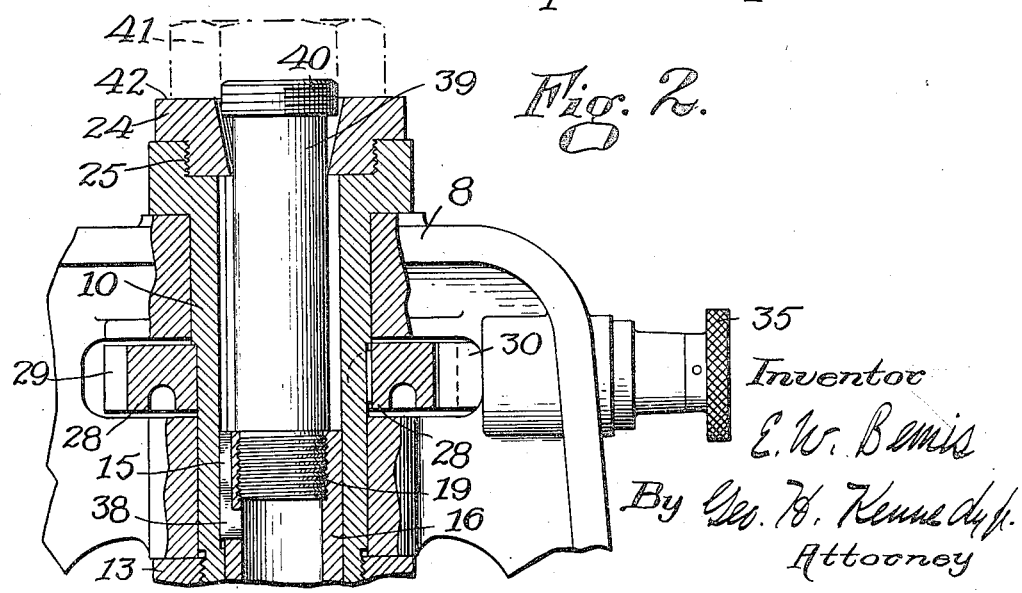
Inventor
E. W. Bemis
By Geo. H. Kennedy
Attorney

UNITED STATES PATENT OFFICE.

EDGAR W. BEMIS, OF WORCESTER, MASSACHUSETTS.

WORK-HOLDING DEVICE.

1,260,130.   Specification of Letters Patent.   Patented Mar. 19, 1918.

Application filed August 3, 1916. Serial No. 113,018.

*To all whom it may concern:*

Be it known that I, EDGAR W. BEMIS, a citizen of the United States, residing at Worcester, in the county of Worcester and Commonwealth of Massachusetts, have invented a new and useful Improvement in Work-Holding Devices, of which the following, together with the accompanying drawings, is a specification.

My present invention relates to a work holding device adapted for holding work to be operated upon by turning, boring, milling, or similar metal working machines. It has for its objects to provide means for securely holding the work to be operated upon and for changing its position to enable different operations to be successively performed upon the same piece of work. I accomplish these objects by means of the construction and arrangement of parts as hereinafter described, the novel features being pointed out in the appended claims.

Referring to the accompanying drawings,

Figure 1 is a side elevation of my improved work holding device, a portion being shown in central sectional view in order to disclose the operative mechanism.

Fig. 2 shows the upper part of my work holding device embodying certain modifications to adapt it for holding work of a different character from that held in the device shown in Fig. 1.

Similar reference characters refer to similar parts in both figures.

The work holding device embodying my present invention is adapted to be supported upon the horizontal table of a boring or milling machine, or upon the vertical face plate of a turning lathe and to be adjustable thereon in order to change the position of the axis of the work being held. In Fig. 1 I have shown my work holding device as supported upon the horizontal surface of a milling machine table 1, which is provided with a groove or channel 2 to receive the feet 3 of the work holding device. The table 1 is provided with a T-slot 4 to receive the heads 5 of bolts 6 carrying nuts 7, by which the work holding device may be firmly clamped upon the supporting table 1. By loosening the nuts 7, the work holding device may be moved in the groove 2 and again clamped in a new position.

The work holding device embodying my present invention consists in a framework 8, mounted upon the feet 3 and containing a central hole 9 to receive a bushing 10, having near its upper end a shoulder 11 and at its lower end an external screw thread 12 to receive a collar 13 by which the shoulder 11 is held against the framework 8, whereby the bushing 10 is held from longitudinal movement. The bushing 10 is provided with a keyway 14 to receive a key 15. Inserted in the lower end of the bushing 10 is a sleeve 16 having at its lower end an external screw thread 17 to receive a hand wheel 18, and at its upper end an internal screw thread 19 to receive a sleeve 20. The sleeve 20 is provided with longitudinal slits 21, 21, preferably three in number. The upper end of the sleeve 20 is provided with an exterior tapered surface 22 fitting the interior tapered surface 23 of a collar 24, which is held in the upper end of the bushing 10 by means of the screw threads 25.

Inserted in the outside of the bushing 10 is a key 26 adapted to engage a keyway 27 in a registering wheel 28. The registering wheel 28 is provided on its periphery with a series of notches 29 which are engaged, as the wheel 28 is turned, by a locking pin 30 slidable in a bushing 31 held in the framework 8, and pressed toward the registering wheel by means of a spiral spring 32 acting against a shoulder 33 on the locking pin and the end 34 of the bushing 31. The movement of the locking pin 30, as acted upon by the spiral spring 32, is limited by a hand knob 35 attached to the outer end of the locking pin. The collar 13 is held from rotation after being screwed against the framework by means of a set screw 36.

The bushing 10 is provided with a shoulder 37 and the key 26, inserted in the side of the bushing 10, projects beyond the bushing flush with the shoulder 37. The key 15 is provided at its lower end with an extension 38, which projects through a hole in the sleeve 16 in order to hold the key from longitudinal movement in the sleeve 16.

The hand wheel 18 is rotated, to draw the connected sleeves 16 and 20 longitudinally into the bushing 10, and also the work which is held in said sleeve 20. As the tapered surface 22 is drawn against the tapered surface 23, the slits 21 in the sleeve 20 become closed upon the work, securely clamping it, with the end to be operated upon projecting above the collar 24. If the work is to be milled, the feet 3 are clamped upon the table 1 to bring the work in proper position to be acted upon by the milling tool. The work is securely locked from rotation by the engagement of the locking pin 30 with one of the notches 29 of the registering wheel 28. When one side of the work has been milled, the locking pin 30 is withdrawn and the registering wheel rotated through any number of degrees desired, carrying with it the bushing 10 and the contained clamping sleeve 20. The notches 29 upon the registering wheel 28 are spaced upon the periphery of the wheel to enable the latter to be locked after each required rotative movement.

In Fig. 2 I have shown a modification of the work holding member, which adapts my device broadly to the milling of the sides of polygonal nuts. This modification consists in removing the split sleeve 20 and inserting in its place a spindle 39, provided at its upper end with an exterior screw thread 40, upon which the nut to be finished is screwed in the position shown by the broken lines 41. By rotating the hand wheel 18, the spindle 39 is drawn longitudinally in the framework, bringing the lower surface of the nut 41 firmly against the upper surface 42 of the collar 24. When one milling operation has been performed, the nut is turned one-quarter of a revolution in the case of a square nut, or one-sixth of a revolution in the case of a hexagonal nut, by rotating the registering wheel 28.

If the table 1 be assumed to be the face plate of a turning lathe, the groove 2 is formed diametrically on the face place, and an adjustment of the framework 8 may be made to give any desired eccentricity to the axis of the sleeve 20 relatively to the axis of the rotating face plate, to enable the work to be turned eccentrically.

As the base of the feet 3, 3 is at right angles to the axis of the work holding member, the axis of the work will be maintained at right angles with the face of the supporting table, thereby insuring that the work performed will always be parallel with the axis of the work; for example, in turning a rod the turned surface will be parallel with the axis of the rod; or in milling the sides of a nut, the milled sides will all be parallel with the axis of the nut. In my improved work holding device, the work holding member is detachable and can be replaced by other forms adapted to special work. In the drawing I have shown two work holding members, viz., the sleeve 20, Fig. 1, and the spindle 39, Fig. 2. The registering wheel is held in an opening 29ª in the framework and may be readily withdrawn and exchanged for wheels with differently spaced spacings, by the withdrawal of the bushing.

I claim,

1. In a work holding device, a framework, means for supporting said framework upon a metal working machine, a removable bushing held from longitudinal movement in said framework with its axis at right angles to the plane of the supporting surface of said framework, a sleeve held in the lower end of said bushing, a work holding member held in the upper end of said bushing and detachably connected with said sleeve, a spline connection between said sleeve and said bushing, means for imparting a longitudinal movement to said sleeve, and means for imparting a predetermined rotative movement to said bushing.

2. In a work holding device, a framework, means for supporting said framework upon a metal working machine, said framework having an opening, a bushing passing through said opening with its axis at right angles to the supporting surface of said framework, a registering wheel inclosed in said opening and detachably held on said bushing, and work holding means non-rotatably held in said bushing.

EDGAR W. BEMIS.

Witnesses:
NELLIE WHALEN,
GEO. H. KENNEDY, Jr.